US006567929B1

(12) United States Patent
Bhagavath et al.

(10) Patent No.: US 6,567,929 B1
(45) Date of Patent: May 20, 2003

(54) NETWORK-BASED SERVICE FOR RECIPIENT-INITIATED AUTOMATIC REPAIR OF IP MULTICAST SESSIONS

(75) Inventors: Vijay K. Bhagavath, Lincroft, NJ (US); Joseph Thomas O'Neil, Staten Island, NY (US); David Hilton Shur, Holmdel, NJ (US); Aleksandr Zelezniak, Matawan, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/353,461

(22) Filed: Jul. 13, 1999

(51) Int. Cl.[7] ................................. G06F 11/00
(52) U.S. Cl. .................. 714/18; 714/748; 370/432
(58) Field of Search .................. 714/18, 748, 749, 714/750, 751, 4; 709/224, 238, 242; 370/390, 432

(56) References Cited

U.S. PATENT DOCUMENTS

| | | | | |
|---|---|---|---|---|
| 6,031,818 A | * | 2/2000 | Lo et al. ................... 370/216 |
| 6,185,698 B1 | * | 2/2001 | Wesley et al. ................ 714/18 |
| 6,247,059 B1 | * | 6/2001 | Johnson et al. ............. 709/237 |
| 6,278,716 B1 | * | 8/2001 | Rubenstein et al. ........ 370/394 |
| 6,392,993 B1 | * | 5/2002 | Hamilton et al. ........... 370/230 |
| 6,415,312 B1 | * | 7/2002 | Boivie ....................... 370/351 |
| 6,505,253 B1 | * | 1/2003 | Chiu et al. ................. 709/235 |
| 6,507,562 B1 | * | 1/2003 | Kadansky et al. ........... 370/216 |

OTHER PUBLICATIONS

Maxemchuk et al., "A Cooperative Packet Recovery Protocol for Multicast Video", 1997, IEEE, pp. 259–266.*

(List continued on next page.)

Primary Examiner—Scott Baderman

(57) ABSTRACT

A system and method provide for recipient-initiated automatic repair of IP multicast sessions. A multicast application on a receiver issues a request to join an IP multicast session "X". A translator/decryption module (TDM) on the receiver intercepts this request and sends it to a controller on a repair server. The controller sends a request to a subscription server to determine if this user has subscribed to the repair service. The controller receives a positive response from the subscription server and determines whether a repair/encryption module exists for this multicast session. If it does not, then the controller selects an IP multicast address, port number and decryption key for a new IP multicast session "Y". This information is returned to the TDM. The controller creates a repair/encryption module (REM) and provides the IP multicast address and port number for the new IP multicast session "Y" and an encryption key to the REM. Then, the TDM stores the session "Y" IP multicast address, port number and decryption key. The REM reads packets from IP multicast session "X" and checks if there are any missing packets. If there are missing packets, it requests one or more retransmit servers for session "X" to obtain the missing packets. The repair/encryption module encrypts the packets and writes them to IP multicast session "Y". The packets for IP multicast session "Y" are processed by the IP stack on the receiver, and are then sent to the translator/decryption module (TDM). The TDM decrypts these packets, modifies the destination IP address and port number from the values for session "Y" to those for session "X". The packets are then sent to the application. The application then presents the message contained in the packets to the subscriber of the IP multicast "X".

7 Claims, 18 Drawing Sheets

OTHER PUBLICATIONS

N.F. Maxemchuk et al., "A Cooperative Packet Recovery Protocol for Multicast Video," Int'l Conf. on Network Protocols, Oct. 29–31, 1997, Atlanta, Ga, pp. 1–8.

S. Pejhan et al., "Error Control Using Retransmission Schemes in Multicast Transport Protocols for Real–Time Media," IEEE/ACM Transactions on Networking, vol. 4, No. 3, Jun. 1996; pp. 413–427.

Diot et al., "Multipoint Communication: A Survey of Protocols, Functions, and Mechanism," IEEE Journal on Selected Areas in Communications, vol. 15, No. 3, Apr. 1997; pp. 277–290.

Holbrook et al., "Log–Based Receiver–Reliable Multicast for Distributed Interactive Simulation," SIGCOMM '95, Cambridge, MA, pp. 328–341.

Delgrossi et al., "HeiTP—A Transport Protocol for ST–II", 1992 IEEE, 0–7803–0608–2/92; pp. 1369–1373.

* cited by examiner

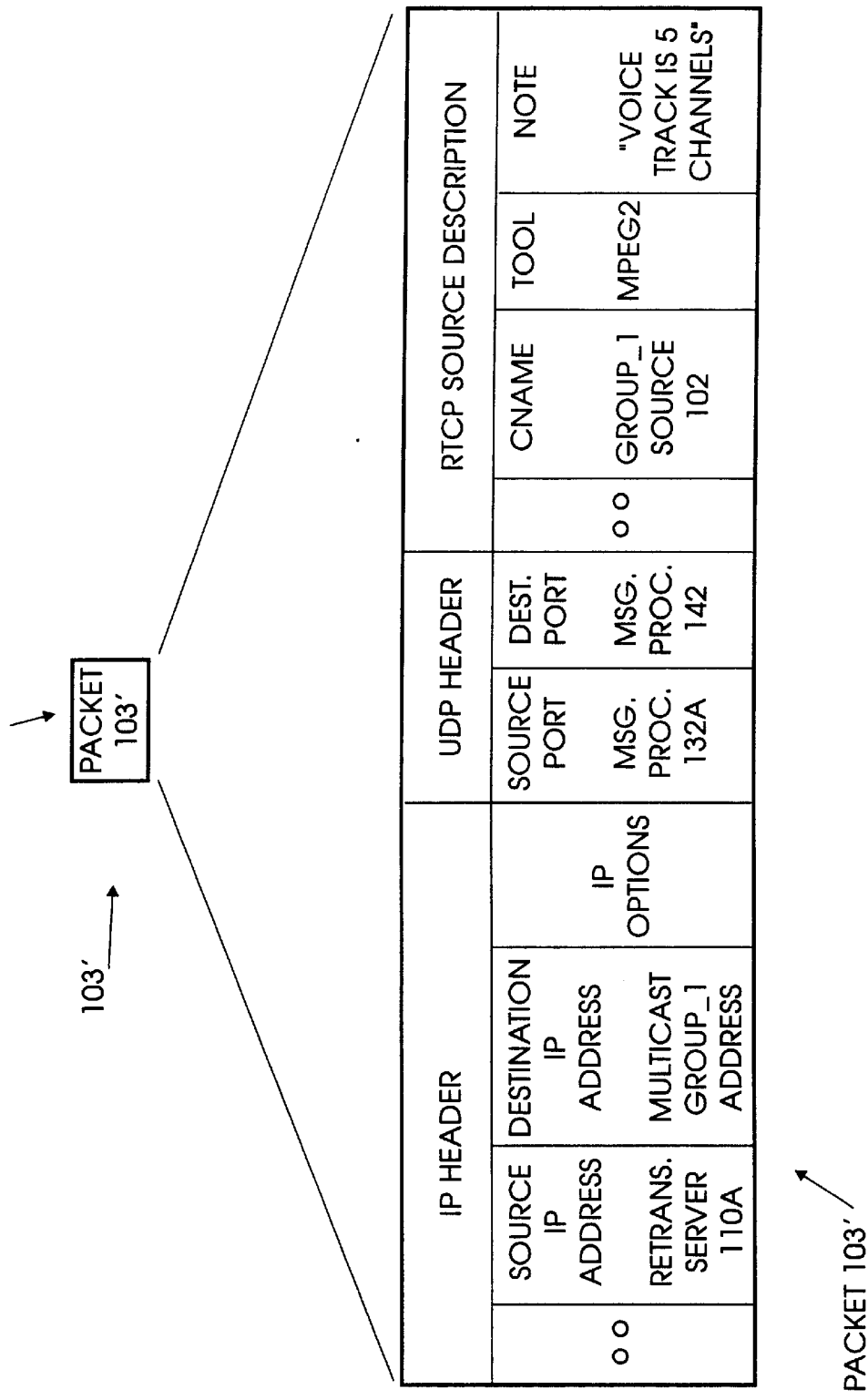

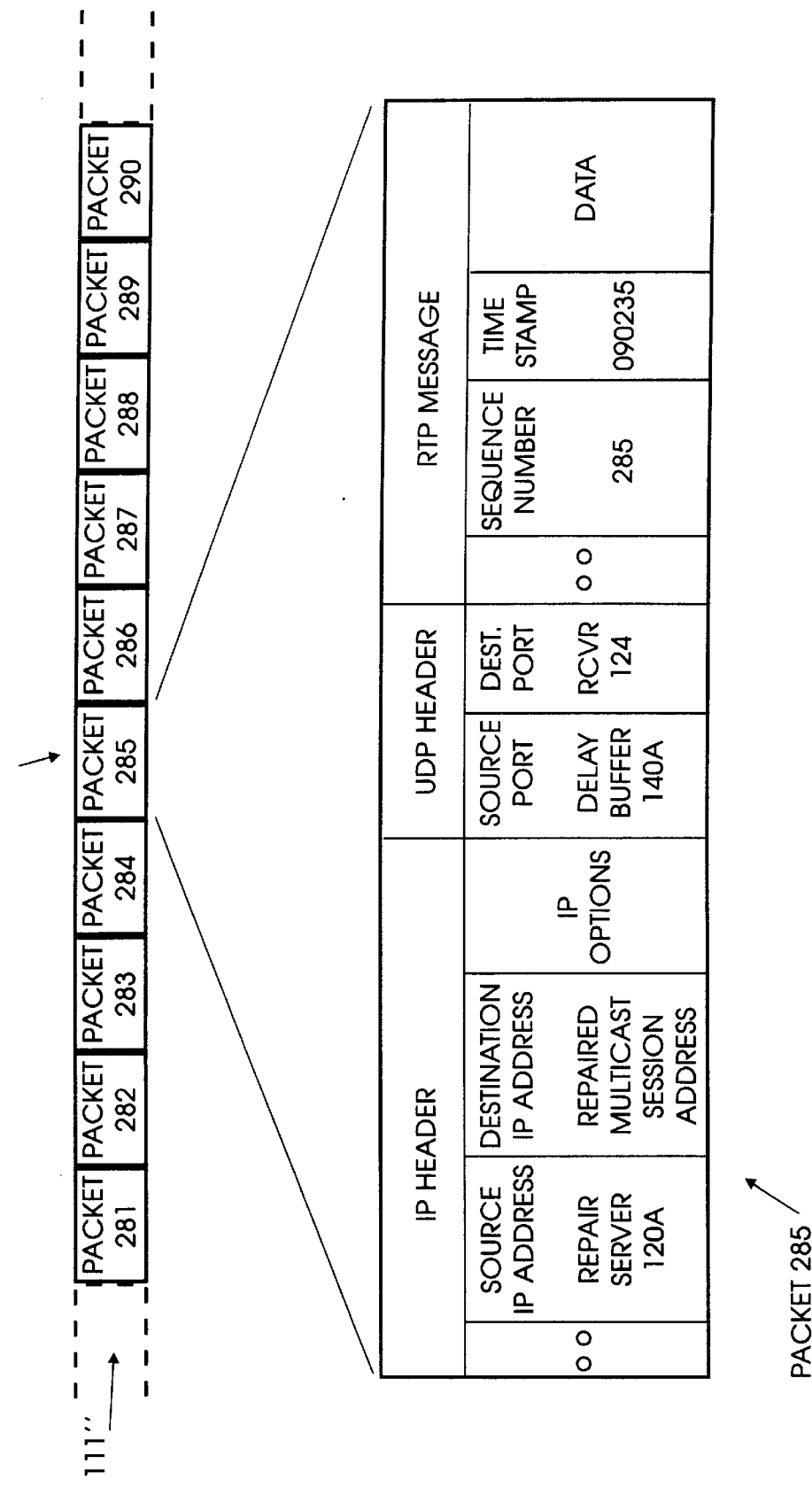

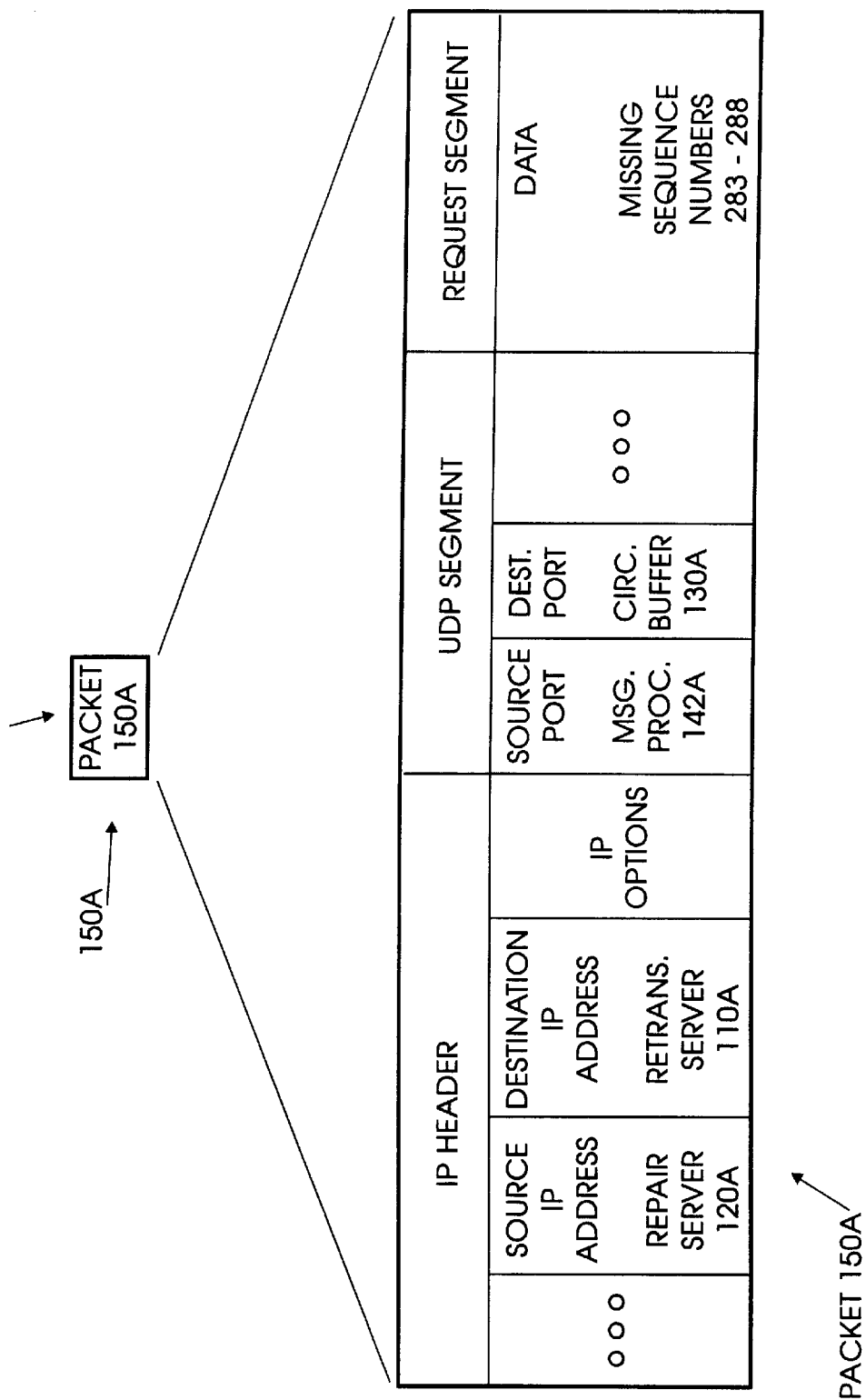

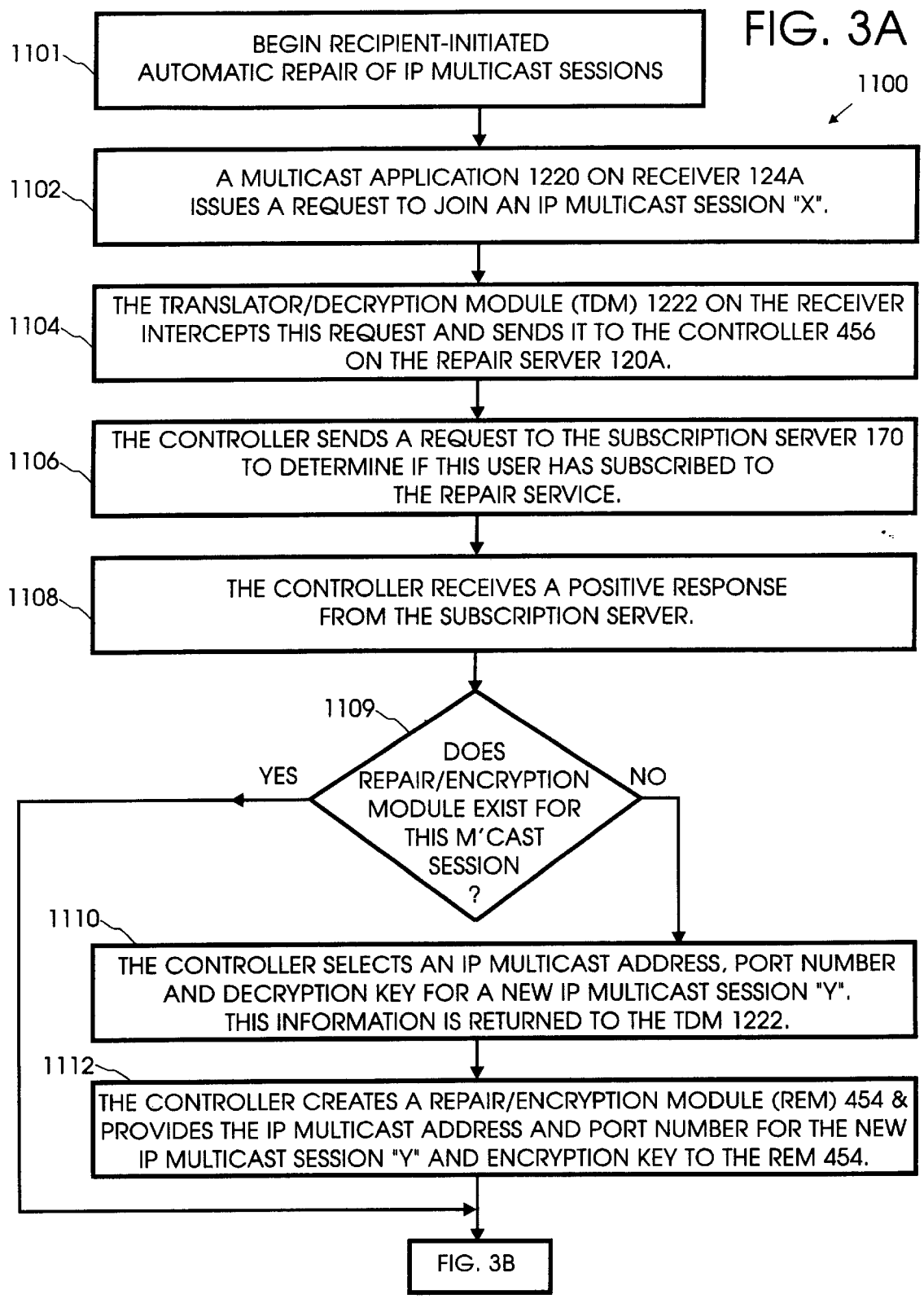

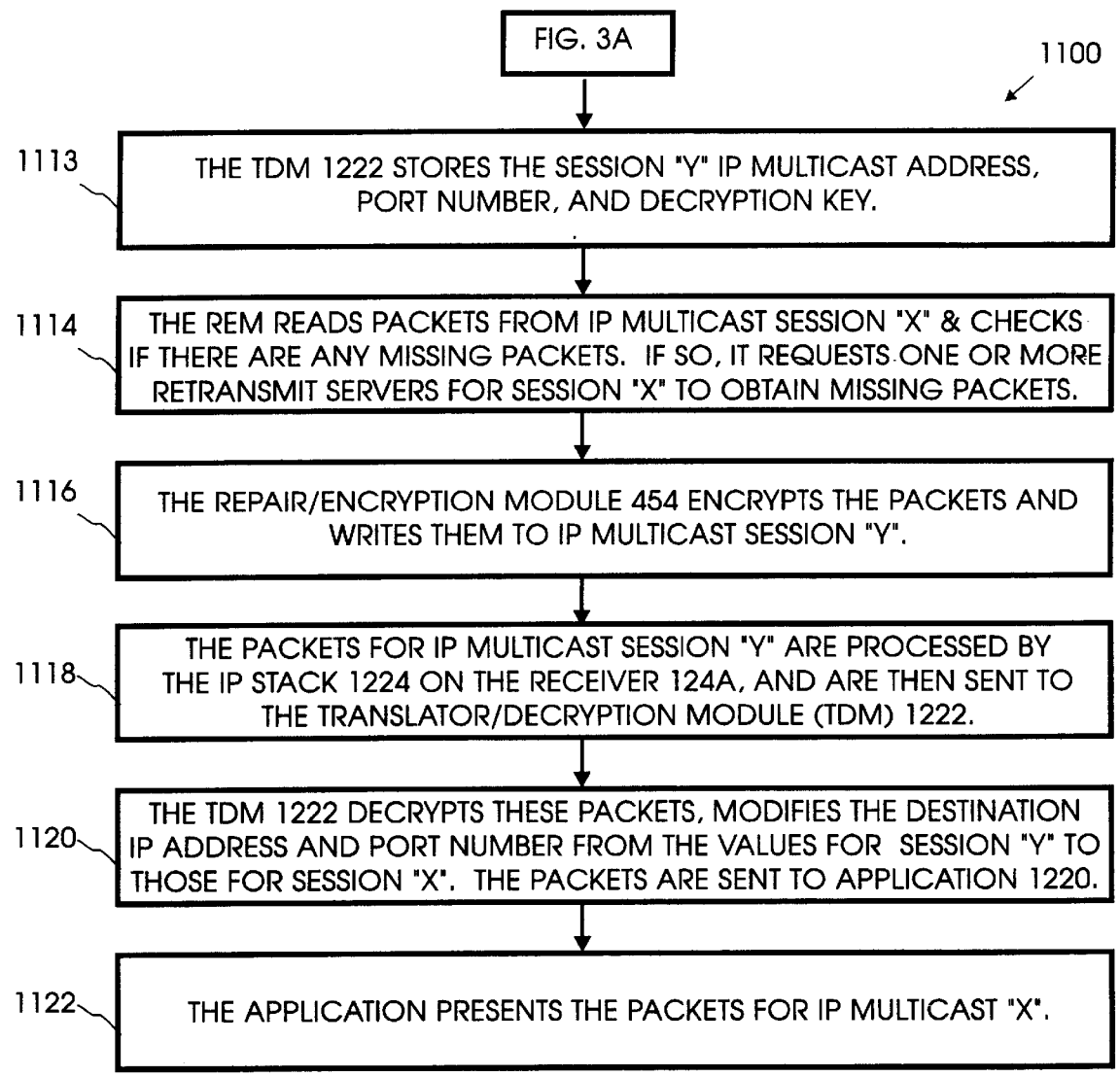

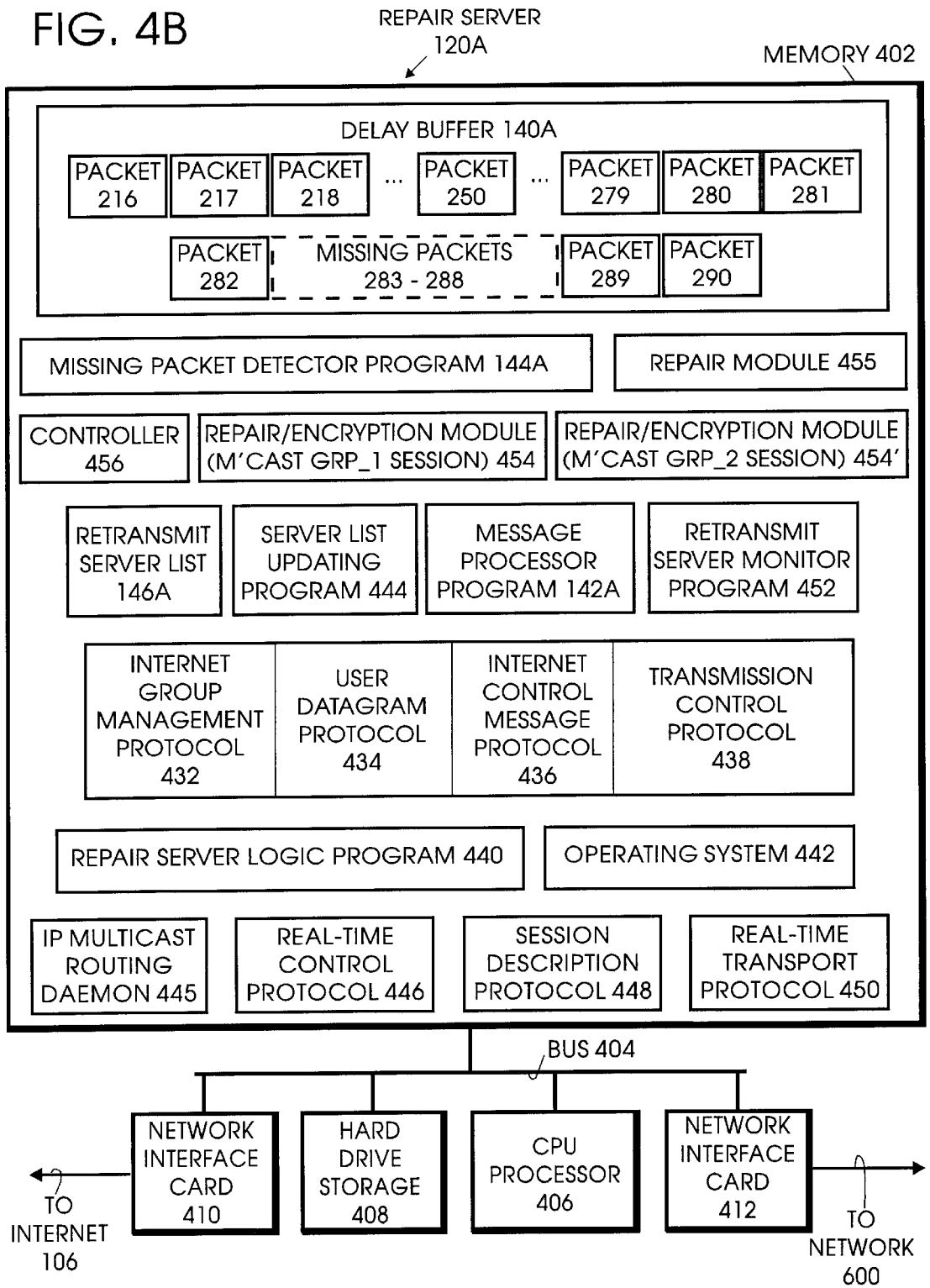

NETWORK-BASED SERVICE FOR RECIPIENT-INITIATED AUTOMATIC REPAIR OF IP MULTICAST SESSIONS

RELATED PATENT APPLICATIONS

This patent application is related to the copending U.S. patent application Ser. No. 09/271,116, filed Mar. 17, 1999, entitled "A Network-Based Service for the Repair of IP Multicast Sessions", by Nicholas Maxemchuk, David McManamon, David Shur, and Aleksandr Zelezniak, assigned to AT&T Corp. and incorporated herein by reference.

This patent application is also related to the copending U.S. patent application Ser. No. 09/306,089 filed May 6, 1999, entitled "A Network-Based Service for Originator-Initiated Automatic Repair of IP Multicast Sessions", by Vijay K. Bhagavath, Joseph T. O'Neil, David Shur, and Aleksandr Zelezniak, assigned to AT&T Corp. and incorporated herein by reference.

BACKGROUND OF THE INVENTION

IP multicasting provides an efficient way for a source to send a stream of User Datagram Protocol (UDP) packets to a set of recipients. The source sends only one copy of each packet to an IP network, such as the Internet, for example. The routers in the IP network do the work required to deliver that packet to each recipient. Various IP multicast routing protocols can be used in an IP network. These allow the routers to communicate with each other so that the multicast datagrams are sent only to those subnetworks with receivers that have joined a multicast session.

A multicast session is identified by an IP address and port number. The IP address is a Class D address in the range from 224.0.0.1 to 239.255.255.255. IP multicasting is more efficient than unicasting for group communication. Unicasting requires that the source send a separate copy of each datagram to each recipient. This requires extra resources at the source and in the IP network and is wasteful of network bandwidth.

Some useful background references describing IP multicasting in greater detail include: (1) Kosiur, D., *IP Multicasting: The Complete Guide to Corporate Networks*, Wiley, 1998; (2) Maufer, T., *Deploying IP Multicast in the Enterprise*, Prentice-Hall, 1997; (3) Deering, S., "Host Extensions for IP Multicasting," Network Working Group Request for Comments Internet RFC-1112, August 1989; (4) Waitzman, D., Partridge, C., Deering, S., "Distance Vector Multicasting Routing Protocol," Network Working Group Request for Comments Internet RFC-1075, November 1988; (5) Schulzrinne, H., Casner, S., Frederick, R., Jacobson, V., "RTP: A Transport Protocol for Real-Time Applications," Network Working Group Request for Comments Internet RFC 1889, Jul. 18, 1994. The IP multicast protocol set forth in the IETF RFC 1112 "Host Extensions for IP Multicasting" is the standard protocol for enabling hosts to establish and conduct IP multicast sessions on the Internet. The IETF RFC 1075, "Distance Vector Multicast Routing Protocol (DVMRP)," describes a protocol for propagating routing information among multicast-enabled routers.

The multicast backbone on the Internet (Mbone) is an extension of the Internet backbone to support IP multicasting. The Mbone is formed collectively by the portion of the network routers in the Internet backbone that are programmed to perform the IP multicast routing protocol. Those routers in the Internet backbone that are programmed to handle IP multicast sessions, as well as unicast sessions, are referred to herein as multicast-enabled routers. The Mbone is a virtual network that is layered on top of sections of the physical Internet. It is composed of islands of multicast-enabled routers connected to each other by virtual point-to-point links called "tunnels." The tunnels allow multicast traffic to pass through the non-multicast-enabled routers of the Internet. IP multicast packets are encapsulated as IP-over-IP, so that they look like normal unicast packets to the intervening routers. The encapsulation is added upon entry to a tunnel and removed upon exit from a tunnel. This set of multicast-enabled routers, their directly connected subnetworks, and the interconnecting tunnels define the Mbone. For additional details, see (1) Comer, Douglas E. *Internetworking with TCP/IP: Volume 1-Principles, Protocols, and Architecture, Third Edition*. Englewood Cliffs, N.J.: Prentice Hall, 1995; (2) Finlayson, Ross, "The UDP Multicast Tunneling Protocol", IETF Network Working Group Internet-Draft, published Sep. 9, 1998, http://search.ietf.org/internet-drafts/draft-finlayson-umtp-03.txt; and (3) Eriksson, Hans, "MBone: The Multicast Backbone," *Communications of the ACM*, August 1994, Vol.37, pp.54–60.

Since the multicast-enabled routers of the Mbone and the non-multicast-enabled routers of the Internet backbone have different topologies, multicast-enabled routers execute a separate routing protocol to decide how to forward multicast packets. The majority of the Mbone routers use the Distance Vector Multicast Routing Protocol (DVMRP), although some portions of the Mbone execute either Multicast OSPF (MOSPF) or the Protocol-Independent Multicast (PIM) routing protocols. For more details about PIM, see: Deering, S., Estrin, D., Farrinaci, D., Jacobson, V., Liu, C., Wei, L., "Protocol Independent Multicasting (PIM): Protocol Specification", IETF Network Working Group Internet Draft, January, 1995.

Multicasting on the Internet has a unique loss environment. On a particular path the losses occur in bursts, as multicast-enabled routers become congested, rather than the losses having the characteristics associated with white noise. When packets are lost on a particular link in the multicast tree, any downstream receivers lose the same packet. Therefore, a large number of retransmissions may occur at the same time in response to negative acknowledgments from receivers. One problem is that such retransmissions are typically in multicast sessions which will tend to encounter the same congested nodes as did the original multicast sessions.

However, congestion in different parts of network is not correlated since traffic to receivers in other parts of the multicast tree does not necessarily pass through the same congested nodes and therefore does not lose the same bursts of packets. Therefore, path diversity would be a good means for recovering at least some of the missing packets, if there were a way to coordinate such a recovery.

Another problem in IP multicasting is that some Internet Service Providers (ISPs) discriminate against multicast packets and discard them before discarding the packets for other services. Therefore, it would be worthwhile balancing the efficiency of multicast transmissions with the quality of point-to-point transmissions.

These problems have been solved by the Network-Based Service for the Repair of IP Multicast Sessions described in the above referenced, copending U.S. patent application by Maxemchuk, et al. In the Maxemchuk, et al. system, a repair server polls multiple transmit servers to accumulate as many of the packets missing from the multicast session as possible. This improves the quality of audio and video multicasts of live conferences, news broadcasts and similar material from one source to many receivers over the Internet.

The invention disclosed herein is an improvement to the Maxemchuk, et al. system, to provide authentic, paying subscribers an automatic repair service for the multicast sessions they receive. The invention disclosed herein also provides for the receiving subscriber to be authorized by a subscription server that causes the subscriber to be billed for the repair service.

SUMMARY OF THE INVENTION

The invention is a system and method for recipient-initiated automatic repair of IP multicast sessions. In one aspect of the invention, a multicast application on a receiver issues a request to join an IP multicast session "X". A translator/decryption module (TDM) on the receiver intercepts this request and sends it to a controller on a repair server. The controller sends a request to a subscription server to determine if this user has subscribed to the repair service. The controller upon receipt of a positive response from the subscription server, then determines whether a repair/encryption module (REM) exists for this multicast session. If it does not receive such a response, then the controller selects an IP multicast address, port number and decryption key for a new IP multicast session "Y". This information is returned to the TDM. The controller creates a repair/encryption module (REM) and provides the IP multicast address and port number for the new IP multicast session "Y" and an encryption key to the REM. Then, the TDM stores the session "Y" IP multicast address, port number and decryption key.

The REM reads packets from IP multicast session "X" and checks if there are any missing packets. If there are missing packets, it requests one or more retransmit servers for session "X" to obtain the missing packets. The repair/encryption module encrypts the packets and writes them to IP multicast session "Y". The packets for IP multicast session "Y" are processed by the IP stack on the receiver, and are then sent to the translator/decryption module (TDM). The TDM decrypts these packets, modifies the destination IP address and port number from the values for session "Y" to those for session "X". The packets are then sent to the application. The application then presents the message contained in the packets to the subscriber of the IP multicast "X".

DESCRIPTION OF THE FIGURES

FIG. 2D illustrates the RTCP source description packet periodically output by the multicast source.

FIG. 2G illustrates, in the alternative, that the repaired multicast session 111" can be a different session that is selectively chosen as a repaired multicast session by the by recipient receivers, having a different multicast IP address and port number than that for the original packet stream of FIG. 2A.

FIG. 2H unicast request 150A from the repair server 120A to the retransmit server 110A for missing packets.

FIG. 2I unicast response 160A to repair server with detected ones of specified packets in buffer.

FIGS. 3A and 3B show a flow diagram 1100 for the recipient-initiated automatic repair of IP multicast sessions.

FIG. 4B is a detailed functional block diagram of the repair server 120A.

DISCUSSION OF THE PREFERRED EMBODIMENT

Figure 1:
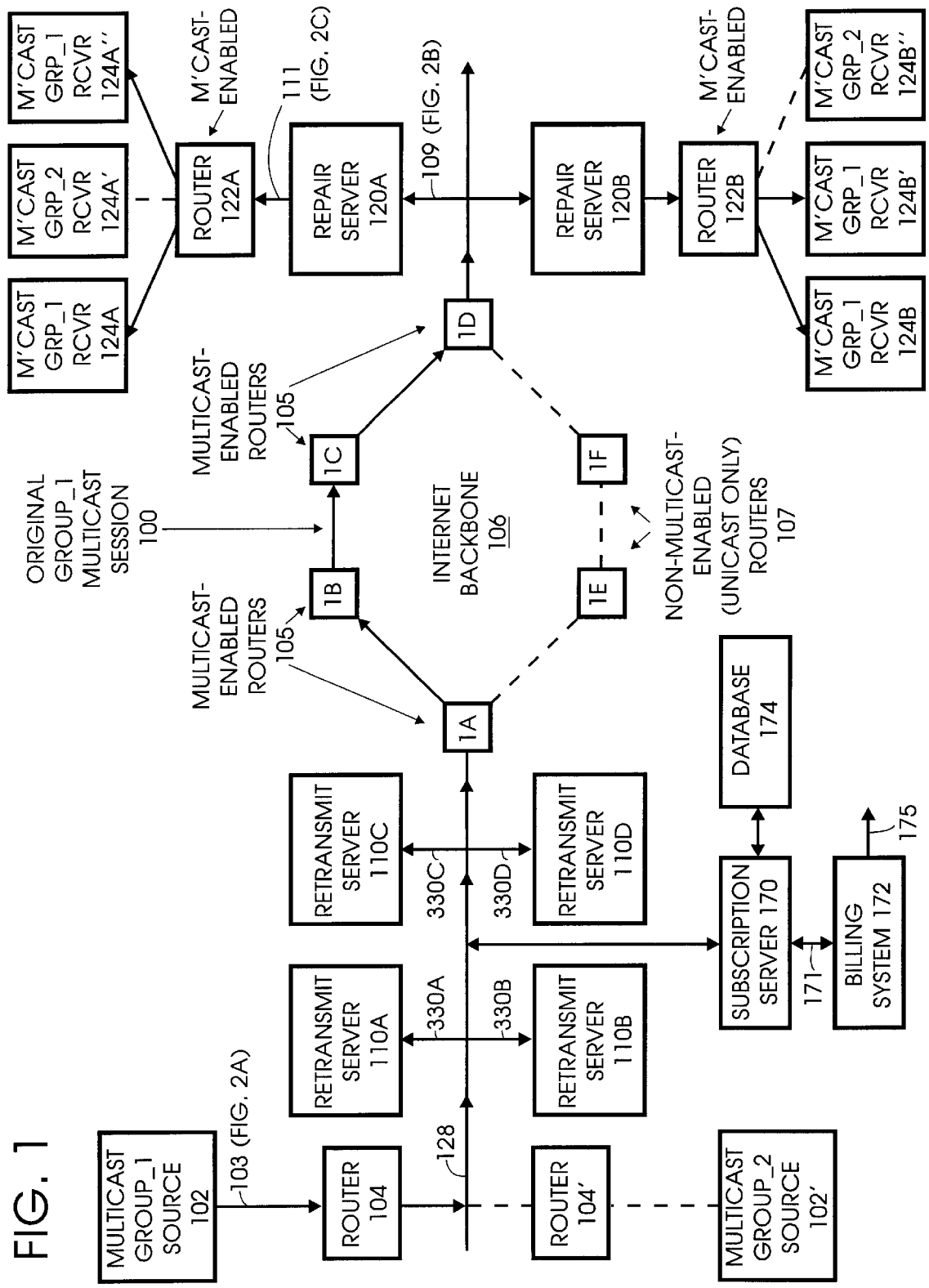
FIG. 1 is an overall network diagram showing the relationship of multicast sources, a plurality of retransmit servers, repair servers, and receivers in the Internet network.

FIG. 1 is an overall network diagram showing a multicast source 102 that is transmitting a Group_1 multicast session 100, whose packets 103 are currently being output by the multicast source 102. The packets pass through the multicast enabled router 104 and are output on line 128 to the Internet backbone 106. A second multicast source 102' is shown transmitting a second Group_2 multicast session onto the Internet backbone 106.

A plurality of retransmit servers 110A, 110B, 110C, and 110D are also shown connected to the Internet backbone 106. Each retransmit server, for example 110A, includes a circular buffer that stores a running segment of the multicast Group_1 session received from the source 102, for example the most recent three second interval of the received session. The session packet stream 103 sent from the source 102 may undergo some packet losses by the time it reaches the retransmit server 110A. Each retransmit server, for example 110A, includes a buffered packet detector that can identify the packets that have been received from the Group_1 session. It can also take advantage of the Real-Time Control Protocol (RTCP), to estimate the number of packets that have been missed from the session. Each retransmit server, for example 110A, includes a message processor that handles message formation and transmission and which handles message receipt and interpretation for message exchanges with other nodes on the network. Refer to the above referenced copending patent applications by Nicholas Maxemchuk, et al. and by Vijay K. Bhagavath, et al, incorporated herein by reference, for a description of the retransmit server features.

The multicast source 102 uses the Real-Time Transport Protocol (RTP) to multicast the packets 103. The Real-Time Transport Protocol (RTP) is carried over User Datagram Protocol (UDP) packets over IP networks from the source 102 to the repair server 120A, and from the source 102 to the retransmit servers 110A, 110B, 110C, and 110D. RTP provides timestamps and sequence numbers. Both the retransmit servers 110A, 110B, 110C, and 110D and the repair server 120A and 120B can use this information to identify when some of the packets 103 are lost or arrive out of sequence. RTP also supports payload type identification, synchronization, encryption and multiplexing and demultiplexing on a per-user basis. For more detailed information on RTP, see (1) Schulzrinne, H., Casner, S., Frederick, R., Jacobson, V., "RTP: A Transport Protocol for Real-Time Applications", Network Working Group Request for Comments Internet RFC 1889, January 1996; (2) Kosiur, D. *IP Multicasting: The Complete Guide to Corporate Networks*, Wiley, 1998.

In FIG. 1, the Internet backbone is shown including a first path that includes multicast-enabled routers 105, respectively labeled 1A, 1B, 1C, and 1D, forming the Mbone portion that can handle IP multicast sessions, such as Group_1 session 100. The Internet backbone is also shown including a second path that includes non-multicast-enabled routers 107, respectively labeled 1E and 1F, which cannot handle IP multicast sessions. Because heavy multicast traffic levels occur that can only be handled by the multicast-enabled routers 105, these routers tend to see high levels of congestion more often that do the non-multicast-enabled routers 107. Repair servers 120A and 120B are shown in FIG. 1 connected to the Internet backbone 106.

FIG. 1 also shows a second plurality of receivers 124B, 124B', and 124B" are shown connected through the multicast-enabled router 122B to the repair server 120B. Receivers 124B and 124B' are receiving the Group_1 session and receiver 124B" is receiving the Group_2 session. FIG. 1 also shows a subscription server 170 and its database 174 connected to the Internet backbone 106. The subscription server 170 is connected through interface 171 to the billing system 172.

Figure 1A:
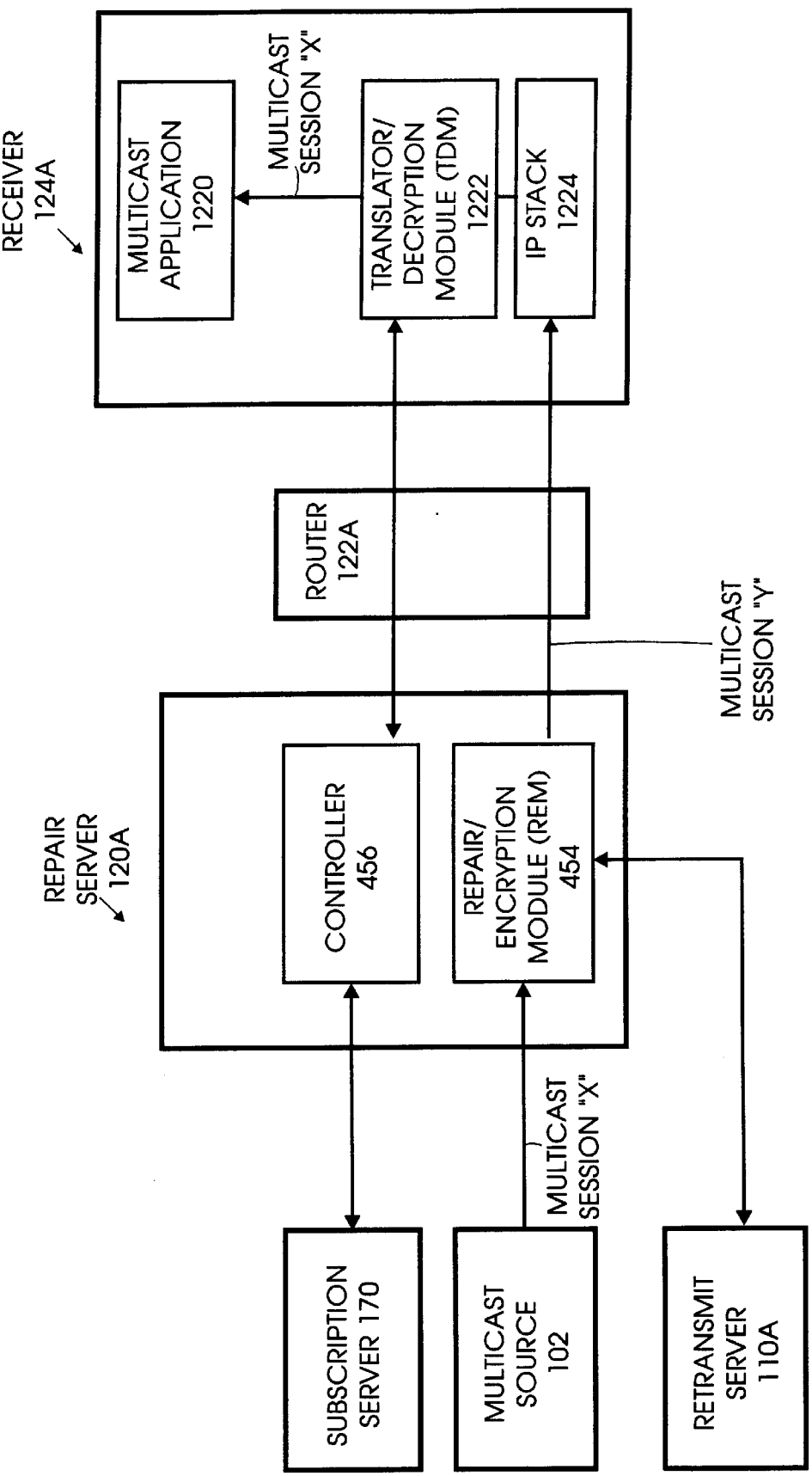
FIG. 1A shows a functional block diagram of the repair server repairing a multicast session "X" which has undergone some packet losses after transmission from the multicast source, into a repaired multicast session "Y" which is forwarded by the router to the receiver.
Figure 1B:
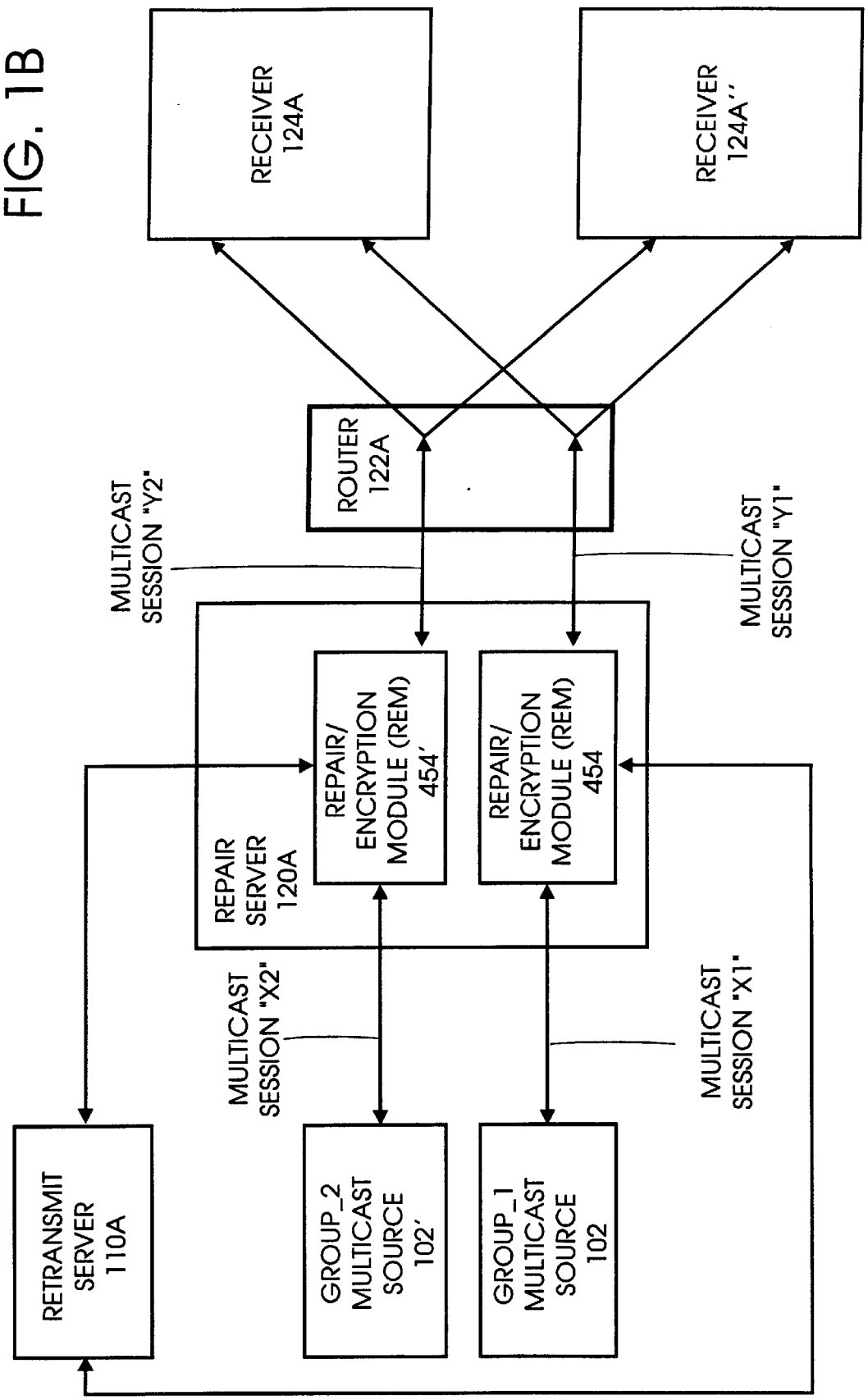
FIG. 1B shows a functional block diagram of the repair server repairing two multicast sessions "X1" and "X2" which have each undergone some packet losses.
Figure 1C:
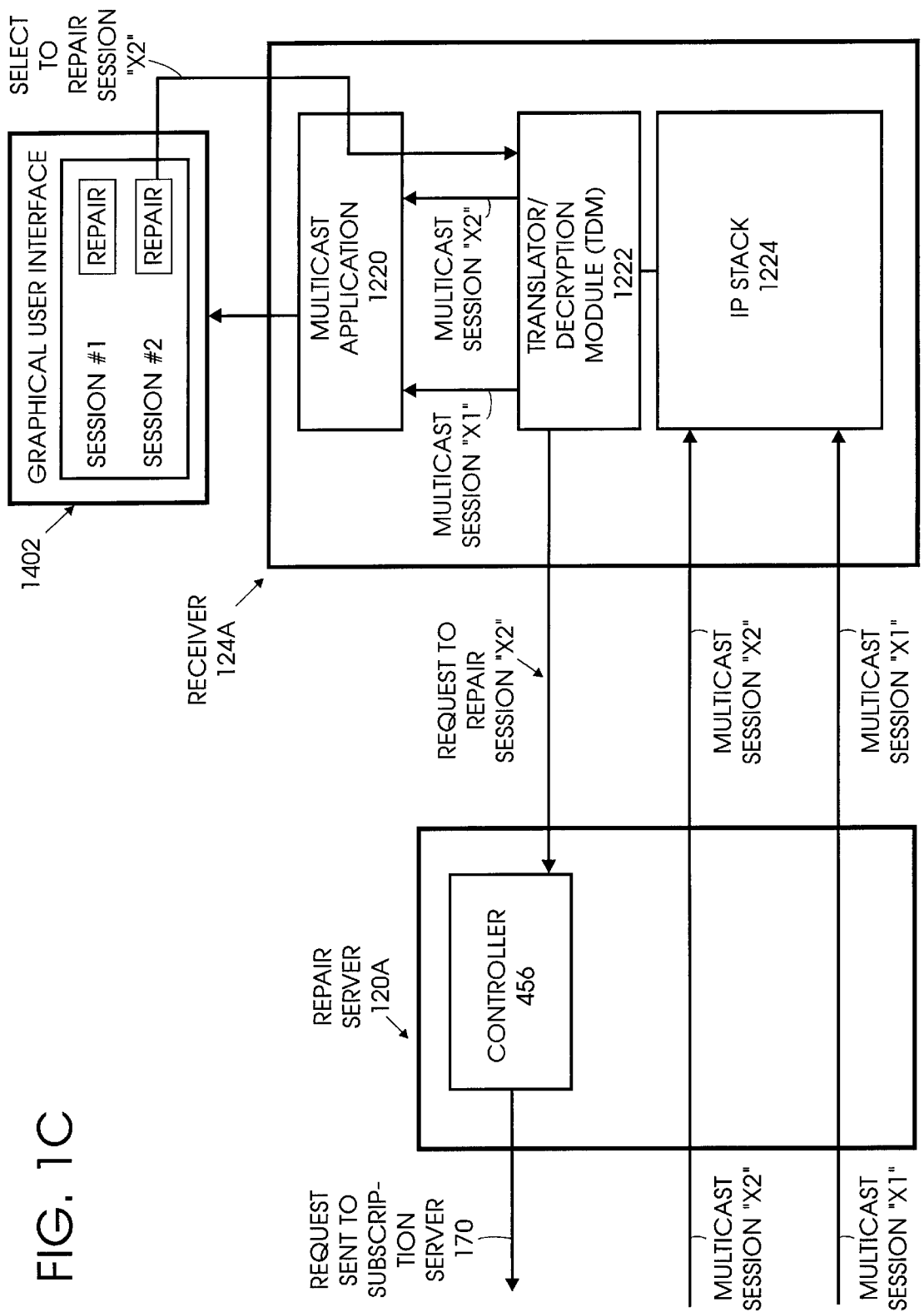
FIG. 1C shows the graphical user interface running on the subscriber's receiver, where the recipient subscriber can initiate a request to join an IP multicast session "X2". The translator/decryption module (TDM) on the receiver intercepts this request and sends it to the controller on the repair server. The controller sends a request to the subscription server to determine if this user has subscribed to the repair service.
Figure 1D:
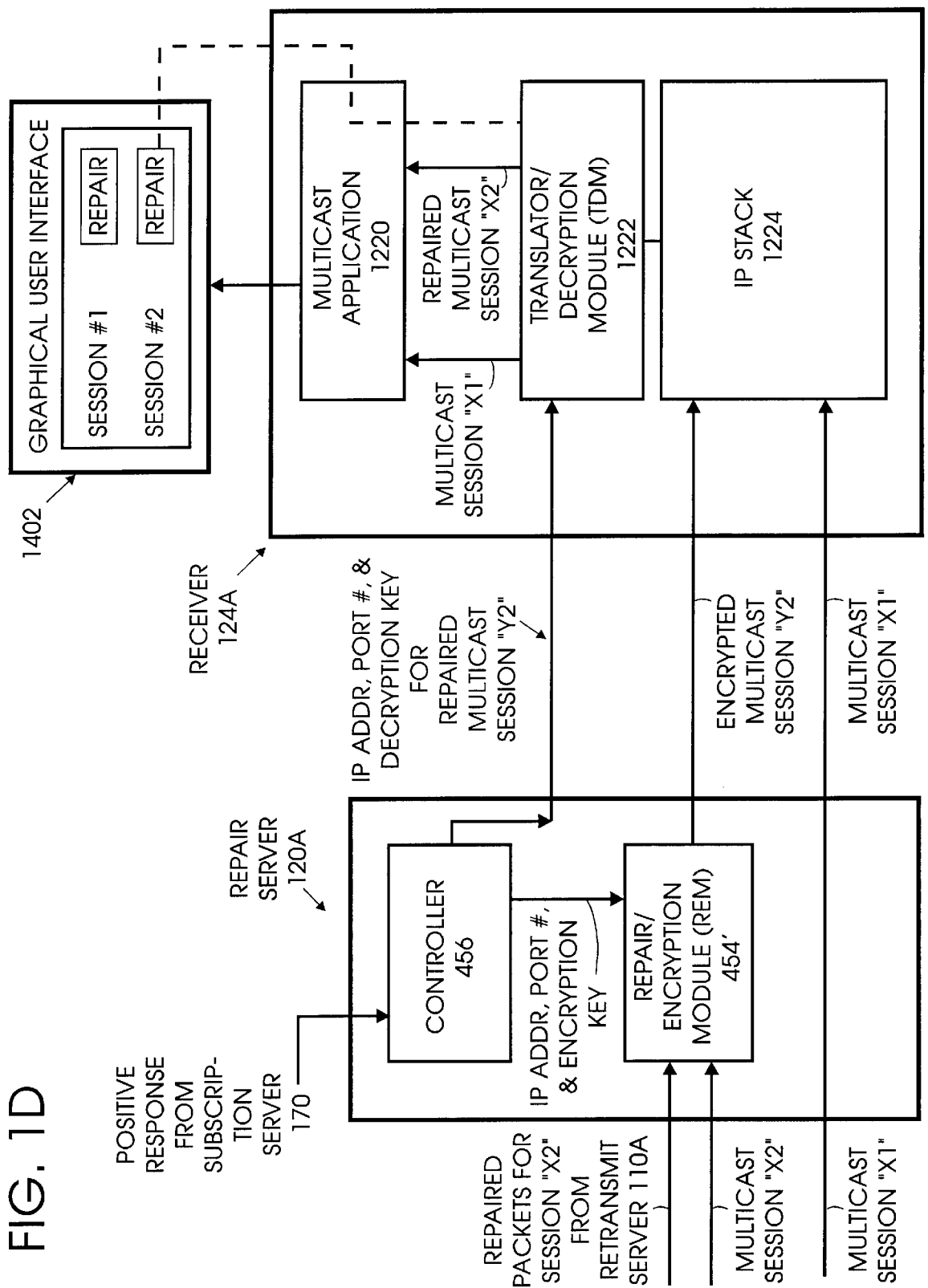
FIG. 1D shows the controller receiving a positive response from the subscription server. The controller selects an IP multicast address, port number and decryption key for a new IP multicast session "Y2", which is returned to the TDM.

FIG. 1A shows a functional block diagram of the repair server 120A repairing a multicast session "X" which has undergone some packet losses after transmission from the multicast source 102, into a repaired multicast session "Y" which is forwarded by the router 122A to the receiver 124A. FIG. 1B shows a functional block diagram of the repair server 120A repairing two multicast sessions "X1" and "X2" which have each undergone some packet losses. FIGS. 1C and 1D are functional block diagrams showing an example sequence in the operation of the invention to enable recipient initiated multicast repair of a multicast session "X2" that has undergone some packet losses after transmission from the multicast source 102, converting into a repaired multicast session "Y2" which is forwarded by the router 122A to the receiver 124A. FIGS. 1C and 1D can be viewed with the flow diagram of FIGS. 3A and 3B.

FIG. 1C shows the graphical user interface 1402 running on the subscriber's receiver 124A. The recipient subscriber can initiate a multicast application 1220 on receiver 124A by issuing a request to join an IP multicast session "X2", as shown in step 1102 of FIG. 3A.

FIG. 1C shows the translator/decryption module (TDM) 1222 on the receiver intercepting this request and sending it to the controller 456 on the repair server 120A, as shown in step 1104 of FIG. 3A. The TDM on the receiver intercepts an application request to repair a specific IP multicast session. This request is sent from the application to the TDM. An application programming interface (API) is provided by the TDM. This API enables a multicast session to request that a specific IP multicast session be repaired.

FIG. 1C shows the controller sending a request to the subscription server 170 of FIG. 1 to determine if this user has subscribed to the repair service, as shown in step 1106 of FIG. 3A. The subscription server's database 174 contains the identity of the individuals who are allowed to use this service. In addition, it contains a variety of other data about that individual. For example, credit card information is stored so that the individual can be charged for these repaired sessions. The subscription server 170 has an interface 171 with the billing system 172 of FIG. 1, so that it can send charges to the billing system. It is then the responsibility of the billing system to issue the appropriate bills 175 to the recipient on a periodic basis.

FIG. 1D shows the controller 456 receiving a response from the subscription server 170. If it is a negative response, then this user has not subscribed to the repair service and the request is not honored by the controller. If it is a positive response from the subscription server, as shown in step 1108 of FIG. 3A, then step 1109 of FIG. 3A determines if a repair/encryption module (REM) 454 exists for this multicast session. If it does, then the process flows to step 1113 of FIG. 3B. If it does not, then the process flows to step 1110 of FIG. 3A. The controller 456 has a simple data structure to track which REMs are repairing which multicast sessions. A plurality of REMs can be in existence simultaneously, one for each multicast session to be repaired. When a multicast session ends, the corresponding REM is deleted. This relinquishes the memory and processor resources in the repair server 120A that a REM is using.

FIG. 1D shows the controller selecting an IP multicast address, port number and decryption key for a new IP multicast session "Y2". This information is returned to the TDM 1222, as shown in step 1110 of FIG. 3A. In step 1112 of FIG. 3A, the controller creates a repair/encryption module (REM) 454 and provides the IP multicast address and port number for the new IP multicast session "Y2" and encryption key to the REM 454'. In step 1113 of FIG. 3B, the TDM 1222 stores the session "Y2" IP multicast address, port number and decryption key. The range of valid IP multicast address is 224.0.0.0 to 239.255.255.255. (Some of the addresses in this range are reserved for special purposes.) The repair server 120A can easily determine which IP multicast address/port pairs are currently in use by examining the destination address and port of the packets that go through it. This is the same machine on which the REM(s) execute. This enables the controller 456 on the repair server to select an IP multicast address/port pair that is not currently used. When the controller 456 selects an unused IP multicast address/port combination, it can easily check the table in which it records the IP multicast address/port combination for each REM. If a REM already exists to repair that IP multicast session, that REM can be used. If a REM does not already exist to repair that IP multicast session, a new REM is created. In the repair server, there is one entry in the REM table for each REM. That entry records: (a) the IP address/port of the session to be repaired, (b) the IP address/port of the repaired and encrypted version of that session, and (c) the encryption key. Each REM 454 can be implemented as an object-oriented object. The instance variables of that object are: (a) the IP address/port of the session to be repaired, (b) the IP address/port of the repaired and encrypted version of that session, and (c) the encryption key. The REM object has methods that implement its various functions. The implementation programming language can be C, C++, Java, or other object-oriented programming language.

Then in step 1114 of FIG. 3B, the REM reads packets from IP multicast session "X2" and checks if there are any missing packets. If so, it requests one or more retransmit servers for session "X2" to obtain missing packets. In step 1116 of FIG. 3B, the repair/encryption module 454 encrypts the packets and writes them to IP multicast session "Y2". Each IP packet contains a header and data. Only the data is encrypted by the REM. The header contains the destination IP address and thus it can not be encrypted. A standard encryption algorithm can be used, such as DES or IPSEC.

In step 1118 of FIG. 3B, the packets for IP multicast session "Y2" are processed by the IP stack 1224 on receiver 124A. The IP stack contains the Transport, Network, Data Link, and Physical layers and performs the standard processing for IP packets. The processed packets are then sent to the translator/decryption module (TDM) 1222. In step 1120 of FIG. 3B, the TDM 1222 decrypts these packets, modifies the destination IP address and port number from the values for session "Y2" to those for session "X2". The packets are sent to application 1220. Then in step 1122 of FIG. 3B, the application presents the packets to the subscriber for IP multicast "X2". The application 1220 needs to be cognizant of the address information. A multicast application 1220 that receives packets can display the IP multicast address/port combination on which it is receiving. For example, an application that presents streaming audio and video from the Internet can display this information. This information can be thought of as analogous to "channel numbers" in radio or TV. Similarly, a videoconferencing application that works with a camera to capture an image, needs to transmit the packets that it generates. The videoconferencing application must know which IP address/port combination is to receive this data.

Figure 2A:
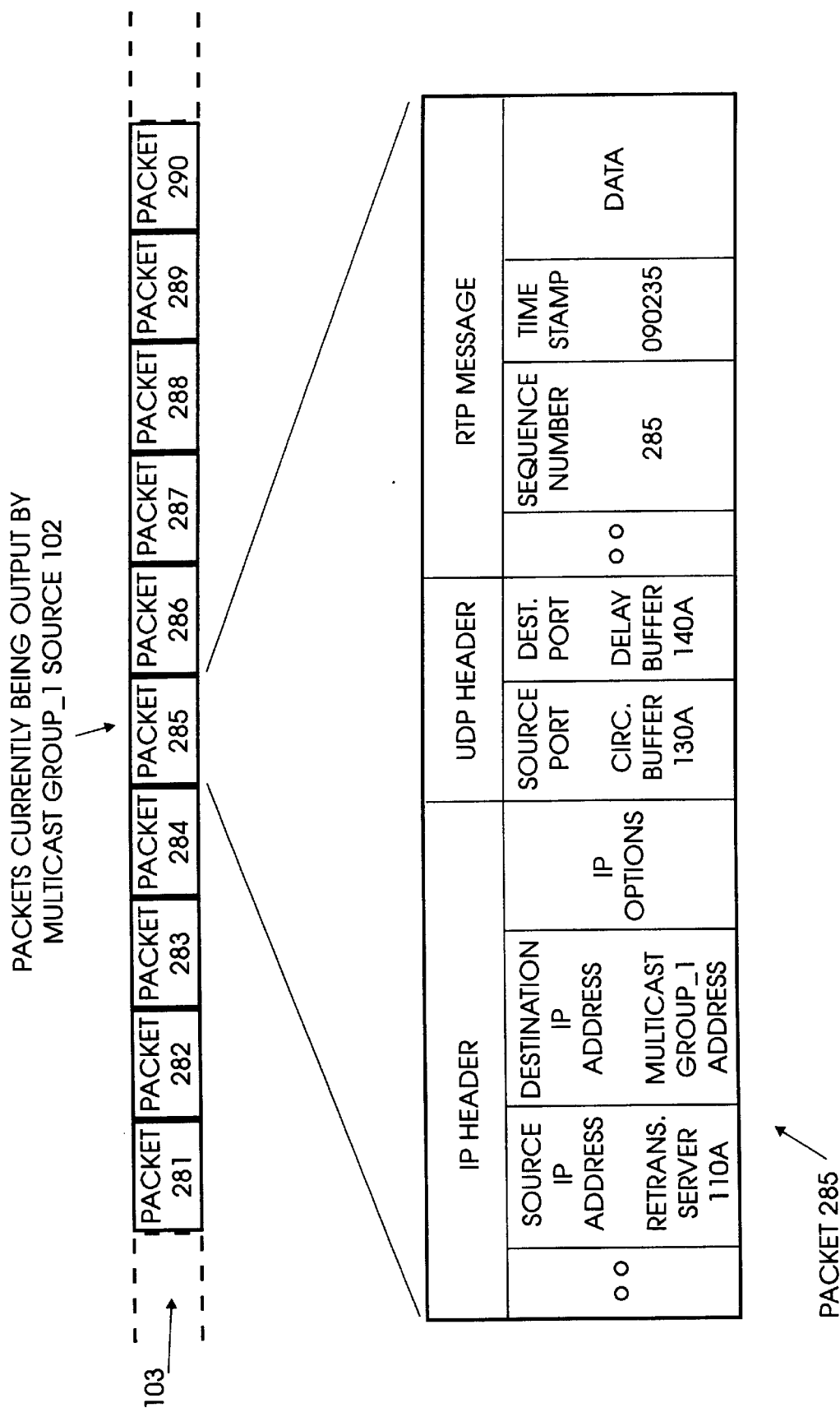
FIG. 2A illustrates the packets currently being output by the multicast source.
Figure 2B:
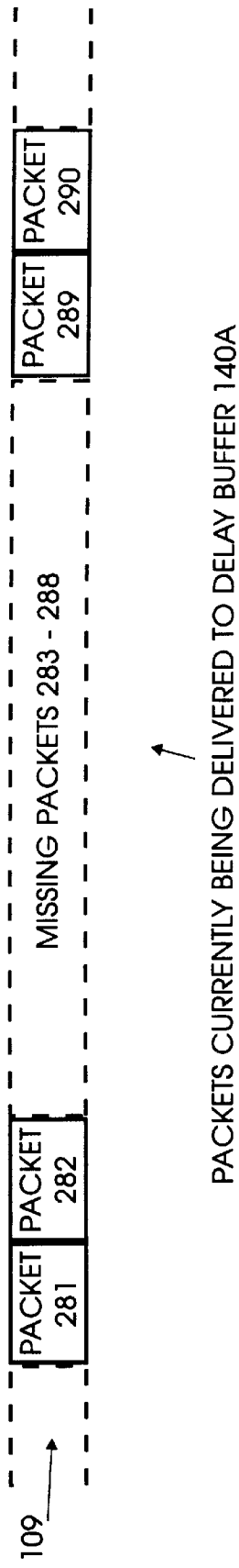
FIG. 2B illustrates the packets currently being delivered to the repair server.
Figure 2C:
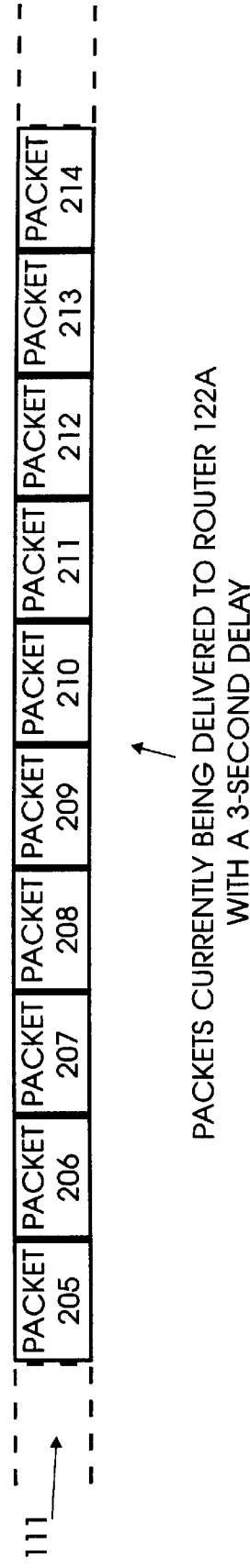
FIG. 2C illustrates the packets currently being delivered to the recipients by the repair server.
Figure 2E:
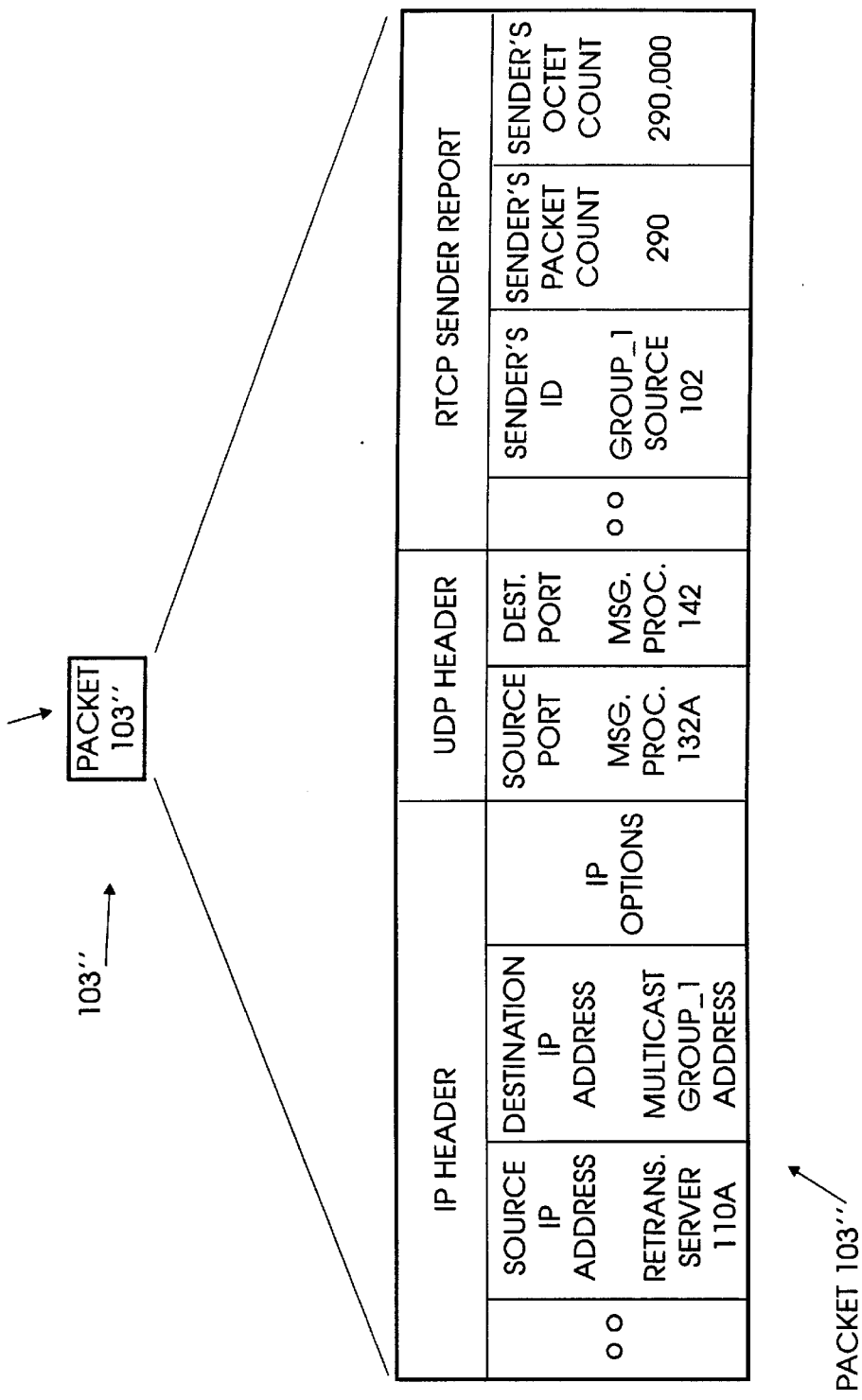
FIG. 2E illustrates the RTCP sender report packet periodically output by the multicast source.

The packets 103 being transmitted by the multicast source 102 in FIG. 1, are shown in FIG. 2A. FIG. 2A illustrates the packets 103 currently being output by the multicast source 102, with packets 281 to 290 being shown. FIG. 2B illustrates the packets 109 currently being delivered to the repair server 120A, namely packets 281, 282, 289, and 290. Note that packets 283–288 are missing from the received session. A plurality of receivers 124A, 124A', and 124A" are shown connected through the multicast-enabled router 122A to the repair server 120A. Receivers 124A and 124A" are receiving the Group_1 session. FIG. 2C illustrates the packets 111 currently being delivered to the recipients at receivers 124A and 124A" by the repair server 120A, namely packets 205–214 which are being buffered for a three-second delay in the repair server 120A, before being multicast to receivers 124A and 124A". Receiver 124A' is shown receiving the second multicast Group_2 session from repair server 120A. FIG. 2D illustrates the RTCP source description packet 103' is periodically output by the multicast source 102. FIG. 2E illustrates the RTCP sender report packet 103" periodically output by the multicast source 102. The Real-Time Control Protocol (RTCP) is the control protocol that is used in conjunction with RTP. Senders 102 can report the number of packets and bytes that are sent. Receivers can report on the loss, delay, and observed jitter (per sender). Other functions include media synchronization, network time protocol (NTP) and RTP timestamp correlation, and session control. For more details on RTCP, see (1) Kosiur, D., *IP Multicasting: The Complete Guide to Corporate Networks*, Wiley, 1998; and (2) Thomas, S., *Ipng and the TCP/IP Protocols: Implementing the Next Generation Internet*, Wiley, 1996.

The RTCP source description packet 103" of FIG. 2D periodically describes in the TOOL field the media tool or application in the source 102 that is generating the packets 103, such as an MPEG2 video and audio compression program. The RTCP source description packet 103' can also describe in the NOTE field the current state of the source, such as the current number of audio channels included in the MPEG2 transmission.

The RTCP sender report packet 103" in FIG. 2E periodically reports the sender's packet count for the source 102. This is the total number of RTP data packets transmitted by the source 102 since starting transmission up until the time this packet 103" was generated. The RTCP sender report packet 103" in FIG. 2E also periodically reports the sender's octet count for the source 102. This is the total number of payload octets (i.e., not including header or padding) transmitted in RTP data packets by the source 102 since starting transmission up until the time this packet 103" was generated. This field can be used to estimate the average payload data rate.

The retransmit servers periodically transmit RTCP receiver reports on the quality of the multicast Group_1 session as received from the source 102. The format of the receiver report (RR) packet is substantially the same as that of the sender report (SR) packet except for minor differences, and except that the packet type field indicates that it is a receiver report. The remaining fields have the same meaning as for the SR packet. The RTCP receiver report includes the SSRC n (source identifier) field that identifies the source 102 to which the information in this reception report pertains. The RTCP receiver report includes the fraction lost field which provides the fraction of RTP data packets from source SSRC_n lost since the previous SR or RR packet was sent. This fraction is defined to be the number of packets lost divided by the number of packets expected, as defined below. The RTCP receiver report includes the cumulative number of packets lost field, which provides the total number of RTP data packets from source SSRC_n that have been lost since the beginning of reception. This number is defined to be the number of packets expected less the number of packets actually received, where the number of packets received includes any which are late or duplicates. Thus packets that arrive late are not counted as lost, and the loss may be negative if there are duplicates. The number of packets expected is defined to be the extended last sequence number received, as defined next, less the initial sequence number received. The RTCP receiver report includes the extended highest sequence number received field, which provides the highest sequence number received in an RTP data packet from source SSRC_n. The RTCP receiver report includes the interarrival jitter field which provides an estimate of the statistical variance of the RTP data packet interarrival time, measured in timestamp units and expressed as an unsigned integer. The interarrival jitter J is defined to be the mean deviation (smoothed absolute value) of the difference D in packet spacing at the receiver compared to the sender for a pair of packets. This is equivalent to the difference in the "relative transit time" for the two packets; the relative transit time is the difference between a packet's RTP timestamp and the receiver's clock at the time of arrival, measured in the same units. The interarrival jitter is calculated continuously as each data packet "i" is received from source SSRC_n, using this difference D for that packet and the previous packet i−1 in order of arrival (not necessarily in sequence). Whenever a reception report is issued, the current value of J is sampled. The RTCP receiver report includes the last SR timestamp (LSR) field that provides the NTP timestamp received as part of the most recent RTCP sender report (SR) packet from source SSRC_n. The RTCP receiver report includes the delay since last SR (DLSR) field, which provides the delay, between receiving the last SR packet from source SSRC_n and sending this reception report. Let SSRC_r denote the receiver issuing this receiver report. Source SSRC_n can compute the round-trip propagation delay to SSRC_r by recording the time A when this reception report is received. It calculates the total round-trip time A-LSR using the last SR timestamp (LSR) field, and then subtracting this field to leave the round-trip propagation delay as (A-LSR-DLSR). This information can be transferred from the source 102 to the retransmit server 110A in the RTCP sender report or the RTCP source description. This field in the RTCP receiver report from the retransmit server 110A may be used as an approximate measure of distance between the source 102 and the retransmit server 110A, although some links have very asymmetric delays. For more details on RTCP, see Schulzrinne, H., Casner, S., Frederick, R., Jacobson, V., "RTP: A Transport Protocol for Real-Time Applications," Network Working Group Request for Comments Internet RFC 1889, Jul. 18, 1994.

Figure 4A:
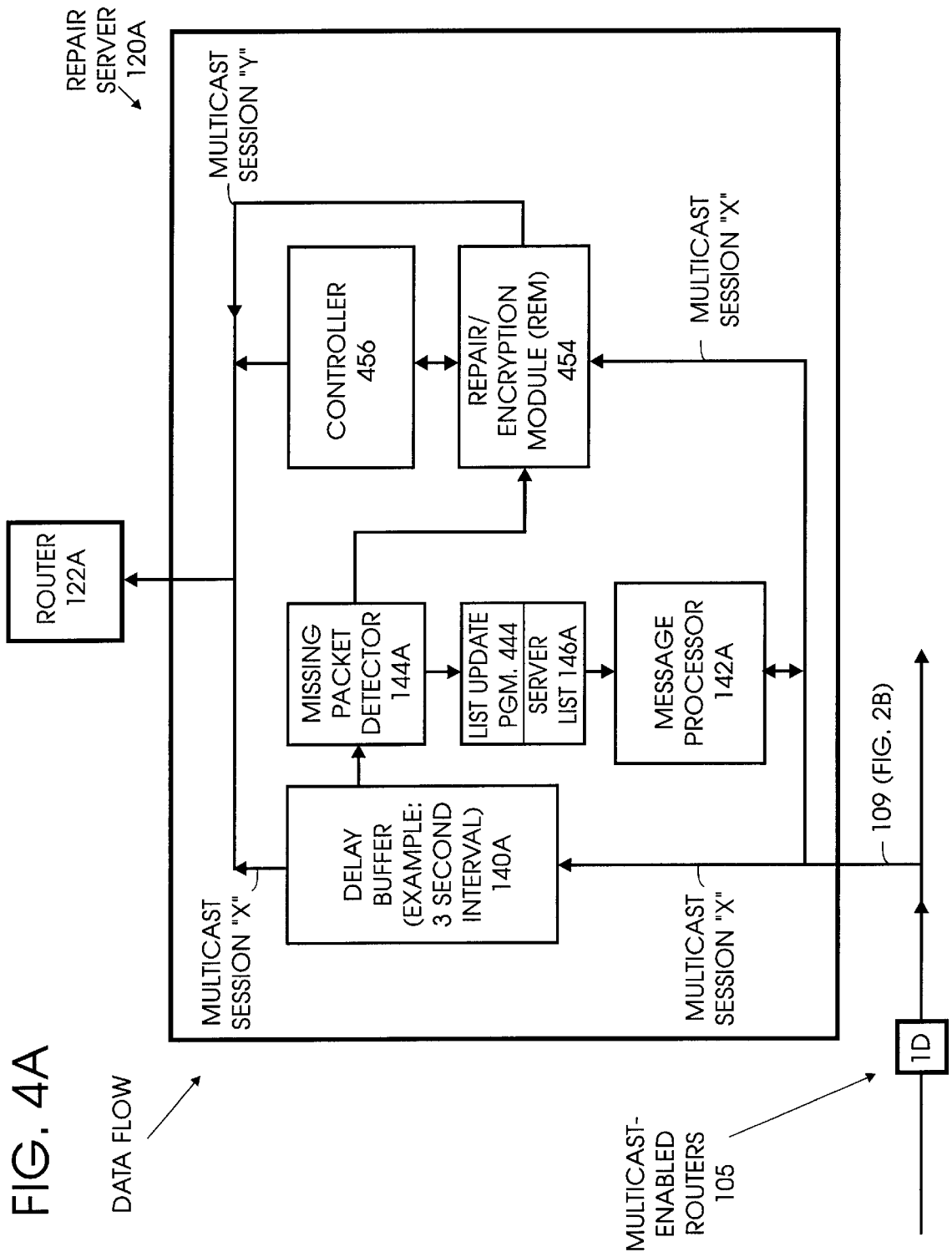
FIG. 4A is a data flow diagram showing the flow of data through the repair server 120A.

Each repair server, for example 120A in the data flow diagram of FIG. 4A, includes a delay buffer 140A that stores a running segment of the multicast Group_1 session received from the source 102, for example the most recent three-second interval of the received session. This three-second delay is applied to the arriving packets 109 before they are forwarded in multicast mode to the receivers 124A and 124A". The session packet stream 103 sent from the source 102 may undergo some packet losses by the time it reaches the repair server 120A. FIG. 2B shows the packets 109 from the Group_1 session received by the repair server 120A, namely packets 281, 282, 289, and 290. Note that packets 283–288 are missing. Each repair server, for example 120A in FIG. 2, includes a missing packet detector 144A that can identify the packets that have been lost from the Group_1 session. The retransmit server list 146A is compiled by a server list updating program 444. The list 146A is an ordered list of the retransmit servers 110A–110D. This list 146A is compiled to enable the repair server 120A to identify which of the several retransmit servers 110A–110D is the most likely one to have the best copy of the Group_1 session packets, in the event that they are needed for repair. The server list updating program 444 can also take advantage of the Real-Time Control Protocol (RTCP) to estimate the number of packets that each retransmit server 110A–110D has missed from the session. The server list updating program 444 can apply a number of performance criteria to rank the respective retransmit servers 110A–110D in the server list 146A. Each repair server, for example 120A in FIG. 4A, includes a message processor 142A that handles message formation and transmission and which handles message receipt and interpretation for message exchanges with other nodes on the network. FIG. 4B is a detailed functional block diagram of a repair server 120A.

Refer to the above referenced copending patent applications by Nicholas Maxemchuk, et al. and by Vijay K. Bhagavath, et al, incorporated herein by reference, for a description of additional repair server features.

The ranking criteria that the server list updating program 444 in the repair server 120A can apply to rank the respective retransmit servers 110A–110D in a server list 146A can be based on the RTCP receiver reports multicast by each of the retransmit servers 110A–110D. The RTCP receiver report includes the fraction lost field which provides the fraction of RTP data packets from source SSRC n lost by a retransmit server 110A, for example, since the previous SR or RR packet was sent. The RTCP receiver report includes the cumulative number of packets lost field, which provides the total number of RTP data packets from source SSRC_n that have been lost by a retransmit server 110A, for example, since the beginning of reception. The RTCP receiver report includes the interarrival jitter field which provides an estimate of the statistical variance of the RTP data packet interarrival time experienced by a retransmit server 110A, for example, measured in timestamp units and expressed as an unsigned integer. The round propagation delay between the source and a retransmit server 110A, for example, may be used as an approximate measure of distance between the source 102 and the retransmit server 110A.

The repair server 120A, for example, maintains the ordered list 146A of the retransmission servers 110A–110D shown in FIG. 1, that are most likely to have buffered copies of packets missing from the Group_1 session. When the repair server 120A detects that there are packets missing from the session it has received, it uses the ordered list 146A to sequentially request the missing packets from respective ones of the plurality of retransmission servers 110A–110D. Assume for this example that the list 146A places the retransmit servers in the order from highest to lowest as 110A, 110B, 110C, 110D, based on the total packets lost, as reported by the RTCP receive report which is multicast by each respective retransmit server 110A–110D. Since retransmit server 110A has reported that it has the fewest total packets lost (4 packets), it is ranked as the most probable to have buffered copies of the missing packets. FIG. 2H shows the first unicast request 150A from the repair server 120A to the retransmit server 110A for missing packets. FIG. 2I illustrates the packets 500A in the unicast response of the first portion of missing packets on hand at the first retransmit server 110A, namely packets 283 and 284. The recovered packets 283 and 284 are added by the repair server 120A to the delay buffer 140A. If the missing packet detector 144A detects that additional packets remain missing, then additional retransmit servers 110B, etc. are requested by the repair server 120A to return additional missing packets.

Each IP multicast source 102 periodically transmits Session Description Protocol (SDP) announcements to inform potential receivers 124A about the existence of a session. In order to join an IP multicast session, software at the receiver 124A, for example, must know the IP address and port of that session. One way this can be done is for the source 102 to periodically announce this information on a well-known IP multicast session. The Session Description Protocol (SDP) used serves two primary purposes: (a) to communicate the existence of a session and (b) to convey sufficient information so end users may join the session. Some of the information included in an SDP datagram is: the name and purpose of the session, time(s) the session is active, the media comprising the session, the transport protocol, the format, and the multicast address and port. Software developers may add other attributes to SDP announcements for specific applications For more detailed information on SDP, see Handley, M. and Jacobson, V., "SDP: Session Description Protocol", Network Working Group Request for Comments Internet RFC 2327, November 1997.

Figure 21:
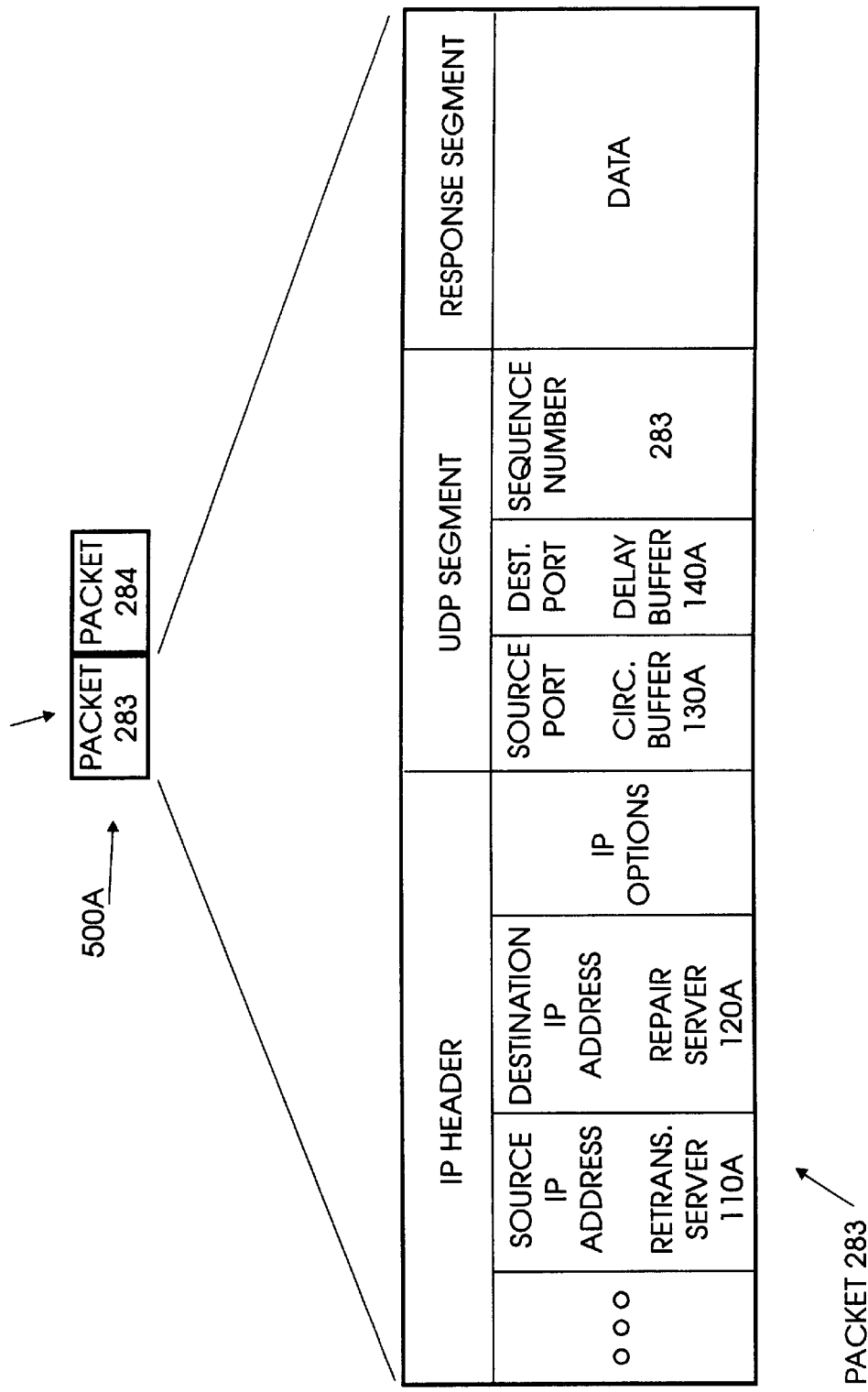

Repaired packets are transmitted from the retransmit servers 110A–110D in a unicast session. Then, the repair server 120A forwards the repaired session as a multicast session 111' to the receivers 124A and 124A". The repaired multicast session 111' is constructed by the repair server 120A by combining the packets 109 of FIG. 2B received in the delay buffer 140A with the missing packets received from the retransmit servers 110A–110D. FIG. 21 illustrates the packets 500A in the unicast response of the first portion of missing packets on hand at the first retransmit server 110A, namely packets 283 and 284.

Figure 2F:
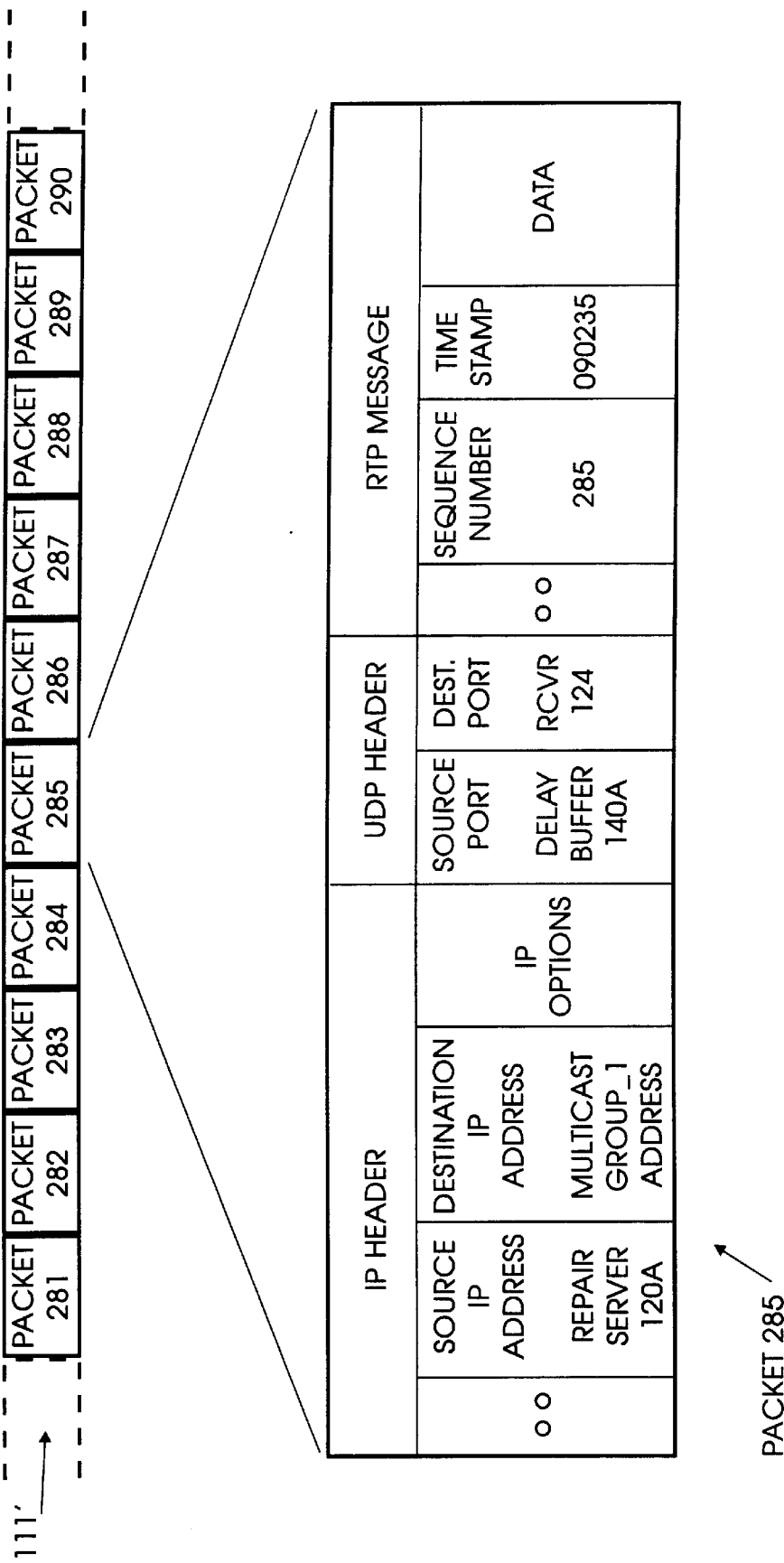
FIG. 2F illustrates the packets in the repaired multicast session 111' constructed by the repair server, which appear to the recipient receivers to be the same Group_1 session transmitted from source, having the same multicast IP address and port number as that for the original packet stream of FIG. 2A.

The repaired multicast session 111' constructed by the repair server 120A resumes using the RTP format as shown in FIG. 2F. FIG. 2F illustrates the packets 111' that are sequentially ordered in the delay buffer in time to be transmitted in a multicast session to the recipient receivers 124A and 124A". For example, missing packets 283 and 284 from the first retransmit server 110A are placed in order following packet 282 in the delay buffer 140A. The delay buffer 140A can be organized for indirect addressing of packets that are buffered at various locations in the buffer 140A. The pointers are sequentially addressed to provide the desired order for the output stream of packets 111'. Each pointer respectively points to a location in the delay buffer 140A where a packet having a sequence number is stored. A first pointer in the output sequence points to packet 282. The next pointer in the output sequence is made to point to the recovered packet 283. The next pointer thereafter in the output sequence is made to point to the recovered packet 284. In this manner, when missing packets are recovered from the retransmit servers, they can be stored at any available location in the delay buffer 140A and the pointer for that packet sequence number is made to point to the storage location of the recovered packet.

The packets in the multicast session 111' of FIG. 2F constructed by the repair server 120A resume using the RTP format. The multicast session 111' can appear to the recipient receivers 124A and 124A" to be the same Group_1 session transmitted from source 102, as is shown in FIG. 2F, having the same multicast IP address and port number as that for the original packet stream 103 of FIG. 2A.

In the alternative, the multicast session 111" can be a different session that is selectively chosen as a repaired multicast session by the by recipient receivers 124A or 124A", as is shown in FIG. 2G, having a different multicast IP address and port number than that for the original packet stream 103 of FIG. 2A. The recipients' subnetwork router 122A can make both the unrepaired multicast session 109 from path 155 and the repaired multicast session 111" from repair server 120A available to the recipient receivers 124A and 124A". The second, repaired multicast session 111" can be selectively subscribed to by the recipients if they find that the unrepaired session 109 has insufficient quality for their purposes.

FIG. 4B is a detailed functional block diagram of a repair server. Memory 402 is connected by bus 404 to the CPU processor 406 that executes the instructions in programs stored in memory 402. Bus 404 also connects to hard drive storage 408, network interface card 410 which connects to the Internet backbone 106, and network interface card 412 which connects to the alternate, bypass network 600 of FIG. 11. Memory 402 has stored in it the delay buffer 140A, missing packet detector program 144A, repair module 455, controller 456, repair/encryption module 454, repair/encryption module 454', retransmit server list 146A, server list updating program 444, message processor program 142A, retransmit server monitor program 452, internet group management protocol 432, user datagram protocol 434, internet control message protocol 436, transmission control protocol 438, repair server logic program 440, operating system 442, IP multicast routing daemon 445, real-time control protocol 446, session description protocol 448, and real-time transport protocol 450. The IP Multicast Routing Daemon 445, as shown in FIG. 4B, is optional and communicates with multicast routing daemons on other routers to determine when the datagrams for a multicast session should be routed from one interface to another interface. The functionality of a multicast firewall can also be included. The communication from the repair server 120A to a retransmit server 110A in making a request for session repair may be multicast, instead of unicast, if the Mbone portion of the Internet backbone is not too congested.

Figure 1E:
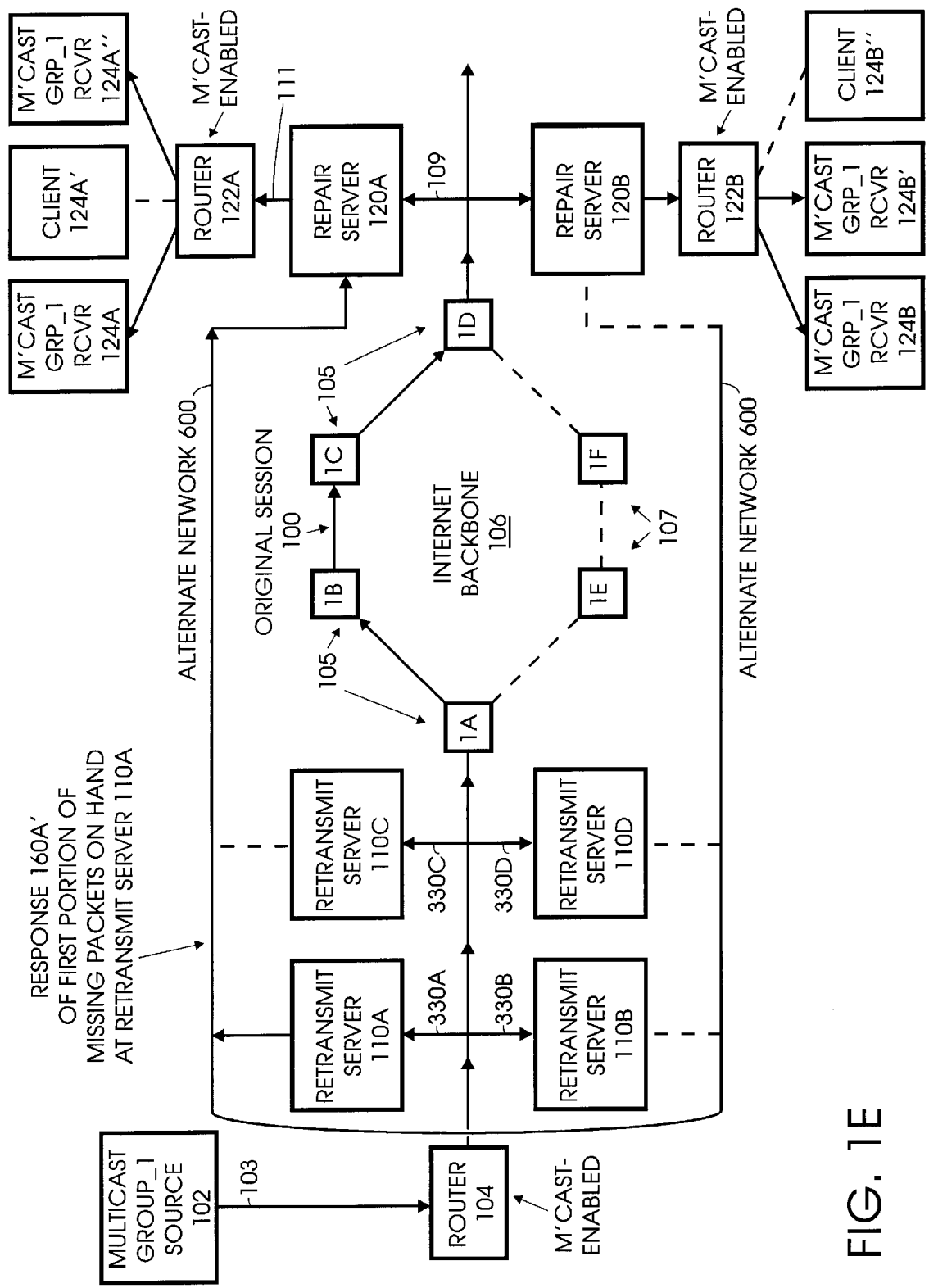
FIG. 1E is an alternate embodiment of the network of FIG. 1, showing an alternate, bypass network used for the responses from the retransmit servers to the repair server, of the portions of missing packets.

FIG. 1E is an alternate embodiment of the network of FIG. 1, showing an alternate, bypass network 600 used for the responses from the retransmit servers 110A, etc. to the repair server 120A, of the portions of missing packets. In accordance with the invention, in response to the requests, a message processor in at least one of the retransmit servers 110A, retransmits in a bypass session to the repair server 120A, at least a portion the missing packets. The retransmitted packets in the bypass session are forwarded to circumvent at least some of the congested, multicast enabled routers 105 in the Internet backbone 106. This can be accomplished by transmitting the missing packets over a separate dial-up network 600 or a private virtual network 600 from the retransmit servers 110A, etc. to the repair server 120A. Another way this can be accomplished is by transmitting the missing packets in a unicast session from the retransmit servers 110A, etc. to the repair server 120A. The unicast response enables non-multicast enabled routers 107 in the Internet backbone to handle the response, thereby circumventing at least some of the congested multicast-enabled routers 105.

Various illustrative examples of the invention have been described in detail. In addition, however, many modifications and changes can be made to these examples without departing from the nature and spirit of the invention.

What is claimed is:

1. A method for repairing multicast packets in a network carrying multicast packets in a multicast session from a source to a plurality of multicast recipients in that session, comprising:

receiving a request from a recipient's receiver to join a first IP multicast session;

intercepting said request and sending it to a controller in a repair server;

determining from a subscription server whether said recipient has subscribed to a repair service;

receiving a positive response at the controller from the subscription server and determining whether a repair/encryption module exists in the repair server for the first multicast session;

selecting at the controller a new IP multicast address and port number and a decryption key for a second IP multicast session;

sending the new IP multicast address and port number and the decryption key to the translator/decryption module;

creating with the controller a new repair/encryption module and providing the new repair/encryption module with the new IP multicast address and port number and the encryption key;

monitoring received ones of the packets to the recipient in the first session with the repair server;

buffering portions of the packets from the first session at a retransmit server in the network; and detecting missing packets in said repair server and in response to said subscriber request, requesting missing packets from said retransmit server.

2. A method of claim 1, which further comprises:

said monitoring including reading packets from said first IP multicast session and checking if there are any missing packets;

requesting said retransmit server to obtain the missing packets;

encrypting packets with the repair/encryption module and writing them to the second IP multicast session;

processing the packets for the second IP multicast session by an IP stack on the receiver;

sending the processed packets to the translator/decryption module;

decrypting the packets at the translator/decryption module and modifying the destination IP address and port number from values for the second session to values for the first session; and sending the packets to the recipient;

whereby the recipient may request that a multicast session be repaired without interrupting any applications that already executing in the receiver.

3. The method of claim 2, which further comprises:

allowing the recipient to selectively subscribe to the repaired multicast session as a network supplied service.

4. The method of claim 2, which further comprises:

limiting the recipient to receive the repaired multicast session as a network supplied service only if the recipient has subscribed to the multicast repair service.

5. The method of claim 2, which further comprises:

encrypting the repaired multicast session as a network supplied service and allowing the recipient access thereto only if the recipient has subscribed to the multicast repair service.

6. A system for repairing multicast packets in a network including a source of multicast packets in a multicast session and a plurality of multicast recipients in that session, comprising:

a controller in a repair server for receiving and forwarding a request from a recipient to join a first IP multicast session;

a subscription server receiving the request from the controller to determine if said recipient has subscribed to a repair service;

said controller receiving a positive response from the subscription server and determining whether a repair/encryption module exists in the repair server for the first multicast session;

said controller generating a new IP multicast address and port number and a decryption key for a second IP multicast session;

said controller sending the new IP multicast address and port number and the decryption key to a translator/decryption module;

a new repair/encryption module created by the controller, said controller providing thereto the new repair/encryption module with the new IP multicast address and port number and an encryption key;

said repair server monitoring received ones of the packets to the recipient in the first session;

a retransmit server in the network buffering portions of the packets from the first session; and said repair server detecting missing packets and in response to a subscriber request, requesting missing packets from said retransmit server.

7. The system of claim 6, which further comprises:

said repair server reading packets from said first IP multicast session and checking if there are any missing packets and requesting said retransmit server to obtain the missing packets;

said repair/encryption module encrypting packets and writing them to the second IP multicast session;

an IP stack in a receiver processing the packets for the second IP multicast session and sending the processed packets to the translator/decryption module;

said translator/decryption module decrypting the packets and modifying a destination IP address and port number from values for the second session to values for the first session and sending the packets to the recipient;

whereby the recipient may request that a multicast session be repaired without interrupting any applications that are already executing in the receiver.

* * * * *